United States Patent Office 3,373,206
Patented Mar. 12, 1968

3,373,206
PROCESS FOR MANUFACTURE OF ALIPHATIC
ARALKYL KETONES
André Rocca, Bolbec, France, assignor to
Oril S.A., Paris, France
No Drawing. Filed Sept. 20, 1965, Ser. No. 488,778
Claims priority, application Great Britain, Sept. 25, 1964,
39,261/64
6 Claims. (Cl. 260—590)

ABSTRACT OF THE DISCLOSURE

Process for manufacture of aliphatic aralkyl-ketones by reacting an organo-magnesium compound with an allyl halide, isomerizing the product to shift the double bond, reacting the product with an organic peroxide to produce a diol-1,2, and converting the diol into a ketone of desired structure by heating in the presence of an arylsulphonic acid catalyst.

---

The present invention provides a process for the manufacture of aliphatic aralkyl-ketones of the following general formula $$X_2 \underset{X_3}{\overset{X_1}{\diagdown}} \diagdown CH-CO-CH_2-Z \qquad (I)$$
$$\phantom{X_2X_3XXXXXXXXXX} Y$$

In the above general formula $X_1$, $X_2$ and $X_3$ each may represent one of the following substituents:

A hydrogen atom, a lower linear or branched alkyl radical containing 1 to 5 carbon atoms, an aryl or aralkyl radical, a lower alkoxy radical containing 1 to 5 carbon atoms, a chlorine or fluorine atom, or a trifluoromethyl group.

Y represents a hydrogen atom or a lower alkyl radical containing 1 to 5 carbon atoms.

Z represents a hydrogen atom or a lower linear or branched alkyl radical containing 1 to 5 carbon atoms.

According to the process of this invention aliphatic aralkyl-ketones of the general Formula I are obtained by the following sequence of reactions $$X_2 \underset{X_3}{\overset{X_1}{\diagdown}} \diagdown -Mg.Hal \longrightarrow X_2 \underset{X_3}{\overset{X_1}{\diagdown}} \diagdown -CH-CH=CH-Z \longrightarrow$$
$$\phantom{XXXXXXXXXXXXXXXXXXXXXXXX} Y$$
$$\phantom{XXX}(II)\phantom{XXXXXXXXXXXX}(III)$$

$$X_2 \underset{X_3}{\overset{X_1}{\diagdown}} \diagdown -C=CH-CH_2-Z \longrightarrow$$
$$\phantom{XXXXXXXXXX} Y$$
$$\phantom{XXXXX}(IV)$$

$$X_2 \underset{X_3}{\overset{X_1}{\diagdown}} \diagdown -COH-CHOH-CH_2-Z \longrightarrow$$
$$\phantom{XXXXXXXXXXXX} Y$$
$$\phantom{XXXXX}(V)$$

$$X_2 \underset{X_3}{\overset{X_1}{\diagdown}} \diagdown -CH-CO-CH_2-Z$$
$$\phantom{XXXXXXXXXX} Y$$
$$\phantom{XXXXX}(I)$$

in which formulae $X_1$, $X_2$, $X_3$, Y and Z have the meanings given above and Hal represents a chlorine, bromine or iodine atom.

The organomagnesium derivative (II), obtained in the usual manner from a suitable halogenated derivative, advantageously reacted with an allylhalide in an anhydrous solvent at a temperature ranging from 0° to 80° C., to form the compound of the general Formula III.

The compound of the general Formula III is isomerised, preferably with an alkaline agent, i.e., an alkali metal hydroxide such as potassium hydroxide, in a suitable solvent, preferably a primary aliphatic alcohol of low molecular weight containing 1–5 carbon atoms at the reflux temperature of the solvent.

The compound (IV) may be transformed into the 1,2-diol by means of an organic peroxide or peroxide-like compound, especially per-formic acid, in an aqueous medium.

The 1,2-diol (V) may be transformed into the ketone (I) by heating it at a temperature from 100° to 160° C. in the presence of an acid catalyst, preferably an arylsulphonic acid.

The ketone (I) is separated from the reaction mixture and purified by a usual method such, for example, as distillation, crystallisation or extraction with an organic solvent.

The following examples illustrate the invention:

EXAMPLE 1

*Preparation of (meta-trifluoromethyl-phenyl)-1-propan-2-one*

(1) 7.65 parts of allylchloride are slowly run into a solution of organomagnesium prepared in absolute ether (from 22.5 parts of meta-trifluoromethylbromobenzene, 2.4 parts of magnesium and 38 parts by volume of ether). The reaction takes 3 hours at the reflux temperature of the solvent. After decomposition with 40 parts of ice, the reaction mixture yields: 14.8 parts of (meta-trifluoromethyl)-phenyl-2-propene boiling at 56–60° C. under 18 mm. Hg $n_D^{25}=1.449$.

(2) 2.5 parts of potassium hydroxide are added to a solution of 10 parts of meta-trifluorophenyl-2-propene in 10 parts of methanol, and the reaction mixture is refluxed for 2 hours. After having neutralised the mixture, the isomeric 1-propene compound is isolated (yield: 8 parts). Boiling at 75–80° C. under 18 mm. Hg pressure $n_D^{25}=1.4735$.

(3) In the course of 3 hours 30 parts of hydrogen peroxide of 30% strength are run at 35–40° C. into a mixture of 37.2 parts of (meta-trifluoromethyl)-phenyl-1-propene and 140 parts of pure formic acid.

The reaction is terminated by further heating for 2 hours at 45° C. The excess volatile reactants are expelled under vacuum. The residue is saponified by means of 30 parts of sodium hydroxide solution during 30 minutes at 40° C.

The diol is isolated by extraction with isopropyl ether. On evaporation of the solvent there are obtained 35 parts of (meta-trifluoromethyl)-phenyl-propane-1,2-diol.

(4) 0.5 part of para-toluenesulphonic acid is added to 10 parts of (meta-trifluoromethyl-phenyl-1-propanediol-1,2 in a vacuum distillation apparatus. A vacuum of 10–20 mm. Hg is produced and the temperature is gradually raised to 150–160° C. while distilling at the same time, to yield the ketone (7.35 parts). Boiling at 105–115° C. under 20 mm. Hg $n_D^{25}=1.4596$.

EXAMPLE 2

*Preparation of phenyl-1-propanone-2*

(1) 7.65 parts of allyl chloride are added to an organomagnesium solution (II) prepared in absolute ether (15.7 parts of bromobenzene (I), 2.4 parts of Mg and 38 parts of ether by volume). The reaction takes 3 hours at the refluxing temperature of the solvent. At the end of the reaction, and after cooling, the mixture is poured onto 40 parts of ice. Decantation and extraction with ether, followed by evaporation of the solvent, gives phenyl-1 propene-2 (III) (yield=9.5 parts). B.P.=156° C., $n_D^{20}=1.5143$.

(2) 10 parts of methanol followed by 2.5 parts of caustic potash pellets are added to 10 parts of (III). The mixture is heated under reflux for 7 hours. It is neutralised, extracted with trichlorethylene, and the solvent evaporated. There is obtained phenyl-1 propene-1 (IV), (yield=8 parts) M.P.=—52° C., B.P.=175° C., $n_D^{20}=1.459$.

(3) 30 parts of 30% hydrogen peroxide are added over the course of 3 hours to a mixture of 23.6 parts of (IV) and 140 parts of formic acid. The reaction is completed by heating for 2 hours at 45° C.

The residual water and formic acid are distilled off in vacuo. The residue is saponified with 30 parts of soda lye (caustic soda) for 30 minutes at 40° C. Extraction with isopropyl ether and evaporation of the solvent yields phenyl-1 propanediol-1,2 (V), M.P., $a$=52–53° C., M.P., $\beta$=92–93° C.

(4) 0.5 part of p-toluenesulphonic acid is added to 10 parts of (V). The mixture is heated to 140–150° C. and then distilled in vacuo at 15–20 mm. Hg. There is obtained phenyl-propanone-2 (I), (yield=7.5 parts) M.P.=27° C., B.P.=216.5° C. B.P.$_{.20}$=102.104° C., $n_D^{20}=1.5168$.

EXAMPLE 3

*Preparation of (p-fluorophenyl)-1 propanone-2*

(1) 7.65 parts of allyl chloride are added to an organomagnesium solution (II) prepared in absolute ether (17.5 parts of p-fluorobromobenzene (I), 2.4 parts of Mg. and 38 parts of ether by volume). The reaction requires 3 hours at the reflux temperature of the solvent. At the end of the reaction and after cooling the mixture is poured ont 40 parts of ice. Decantation and extraction with ether, followed by evaporation of the solvent, yields (p-fluorophenyl)-1 propene-2 (III).

(2) 10 parts of methanol followed by 2.5 parts of caustic potash pellets are added to 10 parts of (III). The mixture is heated under reflux for 7 hours. Neutralisation of the mixture, extraction with trichlorethylene and evaporation of the solvent yields (p-fluorophenyl)-1 propene-1 (IV).

(3) 30 parts of 30% hydrogen peroxide are added to a mixture of 27.2 parts of (IV) and 140 parts of formic acid over the course of 3 hours. The reaction is completed by heating for 2 hours at 45° C.

The residual water and formic acid are distilled off in vacuo. The residue is saponified with 30 parts of soda lye for 30 minutes at 40° C. Extraction with isopropyl ether and evaporation of the solvent yields (p-fluorophenyl)-propanediol-1,2 (V).

(4) 0.5 part of p-toluenesulphonic acid is added to 10 parts of (V). The mixture is heated to 140–150° C. and then distilled in vacuo, at 15–20 mm. Hg. There is obtained (p-fluorophenyl)-1 propanone-2 (I), B.P.$_{.18}$=108° C., $n_D^{20}=1.4965$

EXAMPLE 4

*Preparation of (p-chlorophenyl)-1 propanone-2*

(1) 7.65 parts of allyl chloride are added to an organomagnesium solution (II) prepared in absolute ether (19.15 parts of p-chlorobromobenzene (I), 2.4 parts of Mg and 38 parts of ether by volume). The reaction requires 3 hours at the reflux temperature of the solvent. At the end of the reaction and after cooling, the mixture is poured onto 40 parts of ice. Decantation and extraction with ether, followed by evaporation of the solvent, yields (p-chlorophenyl)-1 propene-2 (III).

(2) 10 parts of methanol followed by 2.5 parts of caustic potash pellets are added to 10 parts of (III). The mixture is heated under reflux for 7 hours. Neutralisation of the mixture, extraction with trichlorethylene and evaporation of the solvent yields (p-chlorophenyl-1 propene-1 (IV).

(3) 30 parts of 30% hydrogen peroxide are added to a mixture of 30.5 parts of (IV) and 140 parts of formic acid over the course of 3 hours. The reaction is completed by heating for 2 hours at 45° C.

The residual water and formic acid are distilled off in vacuo. The residue is saponified with 30 parts of soda lye for 30 minutes at 40° C. Extraction with isopropyl ether and evaporation of the solvent yields (p-chlorophenyl)-1 propanediol-1,2 (V).

(4) 0.5 part of p-toluenesulphonic acid is added to 10 parts of (V). The mixture is heated to 140–150° C. and then distilled in vacuo at 15–20 mm. Hg. There is obtained (p-chlorophenyl)-1 propanone-2 (I), B.P.$_{.12}$=132, B.P.$_{.3}$=100–101, B.P.$_{.0.5}$=95, $n_D^{20}$—1.5328

What I claim is:

1. A process for the manufacture of aliphatic aralkyl-ketones of the formula

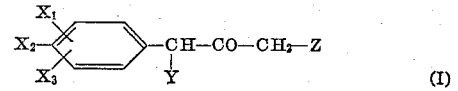

in which $X_1$, $X_2$ and $X_3$ each represent a hydrogen atom, a lower linear or branched alkyl radical containing 1–5 carbon atoms, a phenyl radical, a phenyl-lower-alkyl radical, a lower alkoxy radical containing 1–5 carbon atoms, a chlorine or fluorine atom or a trifluoromethyl group; Y represents a hydrogen atom or a lower alkyl radical containing 1–5 carbon atoms, and Z represents a hydrogen atom or a lower linear or branched alkyl radical containing 1–5 carbon atoms, which comprises the steps (a) reacting an organo-magnesium compound of the formula

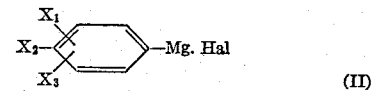

with an allyl halide to give a compound of the formula

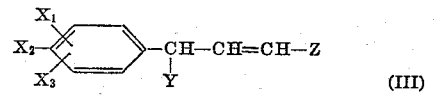

(b) isomerising the compound of the Formula III with an alkali metal hydroxide to give the compound of the formula

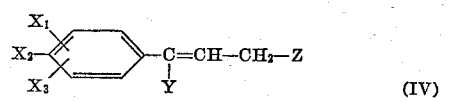

(c) converting the compound of the Formula IV by reaction with an organic peroxide, to a diol-1,2 of the formula

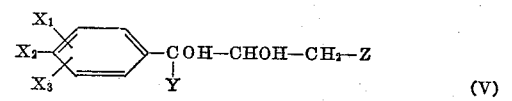

and (d) converting the compound of the Formula V into a ketone of the Formula I by heating it in the presence of an arylsulfonic acid catalyst, in which formula $X_1$, $X_2$, $X_3$, Y and Z have the meanings given above and Hal represents a chlorine, bromine and iodine atom.

2. A process as claimed in claim 1, wherein the allyl halide used in step (a) is allyl chloride and the reaction is carried out in an anhydrous solvent at a temperature ranging from 0–80° C.

3. A process as claimed in claim 1, wherein step (b) is carried out by means of an alkali metal hydroxide in a solvent at the reflux temperature of the solvent.

4. A process as claimed in claim 3, wherein the solvent is a primary lower aliphatic alcohol containing 1–5 carbon atoms.

5. A process as claimed in claim 1, wherein the organic peroxide used in step (c) is performic acid and the reaction is carried out in an aqueous medium.

6. A process as claimed in claim 5, wherein step (d) is carried out by heating at a temperature within the range of 100–160° C.

References Cited

UNITED STATES PATENTS 2,051,266   8/1936   McAllister et al. ____ 260—590

DANIEL D. HORWITZ, *Primary Examiner.*

UNITED STATES PATENT OFFICE
CERTIFICATE OF CORRECTION

Patent No. 3,373,206                               March 12, 1968

Andre′ Rocca

It is hereby certified that error appears in the above numbered patent requiring correction and that the said Letters Patent should read as corrected below.

Column 1, Formulas (I), (II), and (V), and column 4, Formulas (I), (II), and (V), each occurrence, the left-hand portion of the Formulas should appear as shown below:

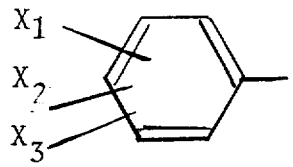

Column 3, line 21, "a=52-53°" should read -- α=52-53° --; line 38, "poured ont" should read -- poured on to --; line 55, "(p-fluorophenyl)-propanediol" should read -- (p-fluorophenyl)-1-propanediol --. Column 4, line 2, "(P-chlorophenyl-1" should read -- (p-chlorophenyl)-1 --; line 17, "$n_D^{20}$ -1.5328" should read -- $n_D^{20}$ = 1.5328 --.

Signed and sealed this 21st day of October 1969.

(SEAL)
Attest:

EDWARD M. FLETCHER, JR.                 WILLIAM E. SCHUYLER, JR.
Attesting Officer                           Commissioner of Patents

UNITED STATES PATENT OFFICE
CERTIFICATE OF CORRECTION

Patent No. 3,373,206                                       March 12, 1968

Andre' Rocca

It is certified that error appears in the above identified patent and that said Letters Patent are hereby corrected as shown below:

Column 1, Formulas (III) and (IV) and column 4, Formula (III) and (IV), each occurrence, the left-hand portion of the Formulas should appear as shown below:

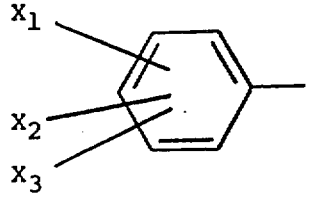

Signed and sealed this 14th day of April 1970.

(SEAL)
Attest:

Edward M. Fletcher, Jr.            WILLIAM E. SCHUYLER, JR.
Attesting Officer                     Commissioner of Patents